United States Patent
Al-Nakhli et al.

(10) Patent No.: US 12,281,258 B2
(45) Date of Patent: Apr. 22, 2025

(54) REMOVAL OF FILTER CAKE

(71) Applicants: Saudi Arabian Oil Company, Dhahran (SA); King Fahd University of Petroleum & Minerals, Dhahran (SA)

(72) Inventors: Ayman Raja Al-Nakhli, Dammam (SA); Mohamed Mahmoud, Dhahran (SA); Zeeshan Tariq, Dhahran (SA); Alade Olalekan Saheed, Dhahran (SA); Muhammad Shahzad Kamal, Dhahran (SA)

(73) Assignees: Saudi Arabian Oil Company, Dhahran (SA); King Fahd University of Petroleum & Minerals, Dhahran (SA)

(*) Notice: Subject to any disclaimer, the term of this patent is extended or adjusted under 35 U.S.C. 154(b) by 81 days.

(21) Appl. No.: 17/657,901

(22) Filed: Apr. 4, 2022

(65) Prior Publication Data
US 2023/0313023 A1 Oct. 5, 2023

(51) Int. Cl.
| | |
|---|---|
| C09K 8/536 | (2006.01) |
| C09K 8/03 | (2006.01) |
| C09K 8/035 | (2006.01) |
| C09K 8/528 | (2006.01) |
| E21B 21/00 | (2006.01) |
| E21B 37/06 | (2006.01) |

(52) U.S. Cl.
CPC ............. *C09K 8/536* (2013.01); *C09K 8/032* (2013.01); *C09K 8/035* (2013.01); *C09K 8/528* (2013.01); *E21B 21/00* (2013.01); *E21B 37/06* (2013.01)

(58) Field of Classification Search
CPC ........ C09K 8/536; C09K 8/032; C09K 8/035; C09K 8/528; E21B 37/06
See application file for complete search history.

(56) References Cited

U.S. PATENT DOCUMENTS

| | | | |
|---|---|---|---|
| 4,846,277 A | 5/1989 | Khalil et al. | |
| 7,080,688 B2 | 7/2006 | Todd et al. | |
| 10,125,305 B2 | 10/2018 | Al Moajil et al. | |
| 2008/0314594 A1* | 12/2008 | Still | C09K 8/72 166/307 |
| 2014/0290951 A1* | 10/2014 | Al-Taq | E21B 37/06 166/300 |

(Continued)

FOREIGN PATENT DOCUMENTS

| | | |
|---|---|---|
| CN | 101493006 | 7/2009 |
| WO | WO 2013078306 | 5/2013 |
| WO | WO 2015161205 | 10/2015 |

OTHER PUBLICATIONS

Ba Geri et al., "Different Techniques for Characterizing the Filter Cake," SPE 163960, presented at the SPE Middle East Unconventional Gas Conference and Exhibition, Muscat, Oman, Jan. 28-30, 2013, 13 pages.

(Continued)

*Primary Examiner* — Aiqun Li
(74) *Attorney, Agent, or Firm* — Fish & Richardson P.C.

(57) ABSTRACT

A method, system, and drilling fluid for treating a wellbore for filter cake removal, including providing the drilling fluid having thermochemical reagents that are encapsulated and acid-generating material that is encapsulated into a wellbore in a subterranean formation to attack filter cake in the wellbore, and attacking the filter cake via the drilling fluid.

16 Claims, 10 Drawing Sheets

(56) References Cited

U.S. PATENT DOCUMENTS

| | | | |
|---|---|---|---|
| 2020/0116001 A1* | 4/2020 | Sayed | E21B 43/25 |
| 2021/0024809 A1 | 1/2021 | Geri et al. | |
| 2021/0062075 A1* | 3/2021 | Kalgaonkar | C09K 8/74 |

OTHER PUBLICATIONS

Ba Geri et al., "Water Base Barite Filter Cake Using Non-Corrosive Agents," SPE 183653, presented the SPE Middle East Oil & Gas Show and Conference, Manama, Kingdom of Bahrain, Mar. 6-9, 2017, 8 pages.

Bageri et al., "Complex Barite Filter Cake Removal using In-Situ Generated Acids by Thermochemicals," Scientific Reports, Sep. 2020, 10:15773, 8 pages.

Cai et al., "Experimental study of water wetting in oil-water two phase flow—Horizontal flow of model oil," Chemical Engineering Science, 2012, 73:334-344, 11 pages.

Chen et al., "Cake formation and growth in cake filtration," Powder Technology, 2009, 192:217-224, 8 pages.

Choi et al., "In-line coagulation with low-pressure membrane filtration," Water Research, May 2004, 38:4271-4281, 11 pages.

Dolan et al., "Factors influencing optimal micro-screen drum filter selection for recirculating aquaculture systems," Aquacultural Engineering, 2013, 56:42-50, 9 pages.

Gray et al., "Optimized Reservoir Drill-In Fluid and Breaker System Design focused on Maximizing Productivity in Open-hole Completions," presented at the 2020 AADE Fluids Technical Conference and Exhibition, Houston, TX, Apr. 14-15, 2020, 8 pages.

Harris et al., "Effective water-based drill-in fluid filter cake cleanup by treatment fluids containing organic acid precursors," Cleansorb, White Paper, Aug. 2014, 15 pages.

Jilani et al., "Effect of overbalance pressure on formation damage," Journal of Petroleum Science and Engineering, 2002, 36:97-109, 13 pages.

Kameda et al., "Removal of polymeric filter cake in petroleum wells: A study of commercial amylase stability," Journal of Petroleum Science and Engineering, 2007, 59:263-270, 8 pages.

Li et al., "Correlation between filter cake structure and filtration properties of model drilling fluids," SPE 28961, presented at the SPE International Symposium on Oilfield Chemistry, San Antonio, Texas, Feb. 1995, 11 pages.

Mahmoud, "Well clean-up using a combined thermochemical/chelating agent fluids," J. Energy Resour. Technol. Trans., Oct. 2019, 141:102905, 6 pages.

Mohamed et al., "Removal of Calcium Carbonate Water-Based Filter Cake Using a Green Biodegradable Acid," Sustain, Jan. 2020, 12(3):994, 10 pages.

Schejbal et al., "Modelling of diesel filters for particulates removal," Chemical Engineering Journal, 2009, 154:219-230, 12 pages.

Tariq et al., "Reduction of Breakdow Pressure by Filter Cake Removal Using Thermochemical Fluids and Solvents: Experimental and Numerical Studies," Molecules, Jul. 2021, 26:4407, 21 pages.

* cited by examiner

300 ● Encapsulated Thermochemicals A

302 ◌ Encapsulated Thermochemical B + Acid

304 ○ Encapsulated In-situ Generating Acid Materials

200 — Encapsulated Thermochemicals

202 — Encapsulated In-situ Generating Acid Materials

400 — Encapsulated Chelating Agent

REMOVAL OF FILTER CAKE

TECHNICAL FIELD

This disclosure relates to techniques for removing filter cake from a wellbore.

BACKGROUND

Drilling fluid aides the drilling of holes into a subterranean formation in the Earth crust. The holes may be labeled as a borehole or a wellbore. The drilling fluid may be called drilling mud. The hole may be drilled for the exploration or production of crude oil and natural gas. The hole may be drilled for other applications, such as a water well. During the drilling, the drilling fluid may cool and lubricate the drill bit and also carry and remove rock cuttings from the hole. The drilling fluid may provide hydrostatic pressure to prevent or reduce formation fluids from the subterranean formation entering into the hole during drilling. Drilling fluids can include completion fluids, workover fluids, drill-in fluids, and so on.

Drilling fluids may be mixtures of solid additives present as discontinuous phases spread in a liquid continuous phase. The liquid can be water in the case of water-based drilling fluids or oil for the oil-based drilling fluids. As indicated, the drilling fluids may be designed to achieve different operational objectives including lubrication of the drill bit and drill string, transferring the drilled cuttings out of the hole while drilling, and suspending cuttings when the fluid circulation is stopped. Another objective may be to prevent the formation fluids from invading the wellbore hole. In the drilling operation with the drilling fluid, wellbore stability may be promoted by forming a low-permeability film on the borehole wall labeled as filter cake (also called cake, mudcake, or wall cake). The filter cake may also beneficially reduce drilling fluid invasion into the drilled formation.

A wellbore in a subterranean formation may be treated. The wellbore treatments may be to facilitate production of hydrocarbon, such as crude oil or natural gas, from the subterranean formation. A wellbore treatment can be to treat (remove) filter cake.

SUMMARY

An aspect relates to a method of treating a wellbore for filter cake removal, including providing a drilling fluid having thermochemical reagents that are encapsulated and acid-generating material that is encapsulated into a wellbore in a subterranean formation to attack filter cake in the wellbore, and attacking the filter cake via the drilling fluid.

Another aspect relates to a method of drilling a wellbore and treating filter cake, including drilling the wellbore in a subterranean formation with a drilling fluid, forming filter cake along a wall of the wellbore from solids in the drilling fluid, and adding additives for treating filter cake to the drilling fluid, wherein the additives include thermochemical reagents that are encapsulated and acid-generating material that is encapsulated. The method includes attacking the filter cake via the additives in the drilling fluid.

Yet another aspect relates to a drilling fluid including solids to form a filter cake along a wall of a wellbore, the drilling fluid configured to be utilized to drill the wellbore. The drilling fluid includes thermochemical reagents that are encapsulated, wherein the thermochemical reagents include an ammonium-containing compound and a nitrite-containing compound to react with each other to generate heat. The drilling fluid includes acid-generating material that is encapsulated, the acid-generating material to be activated by the heat to generate acid in the wellbore to attack the filter cake, and wherein the acid includes hydrofluoric acid (HF) or hydrochloric acid (HCl), or a combination thereof.

The details of one or more implementations are set forth in the accompanying drawings and the description below. Other features and advantages will be apparent from the description and drawings, and from the claims.

BRIEF DESCRIPTION OF DRAWINGS

Like reference numbers and designations in the various drawings indicate like elements.

DETAILED DESCRIPTION

Figure 1:
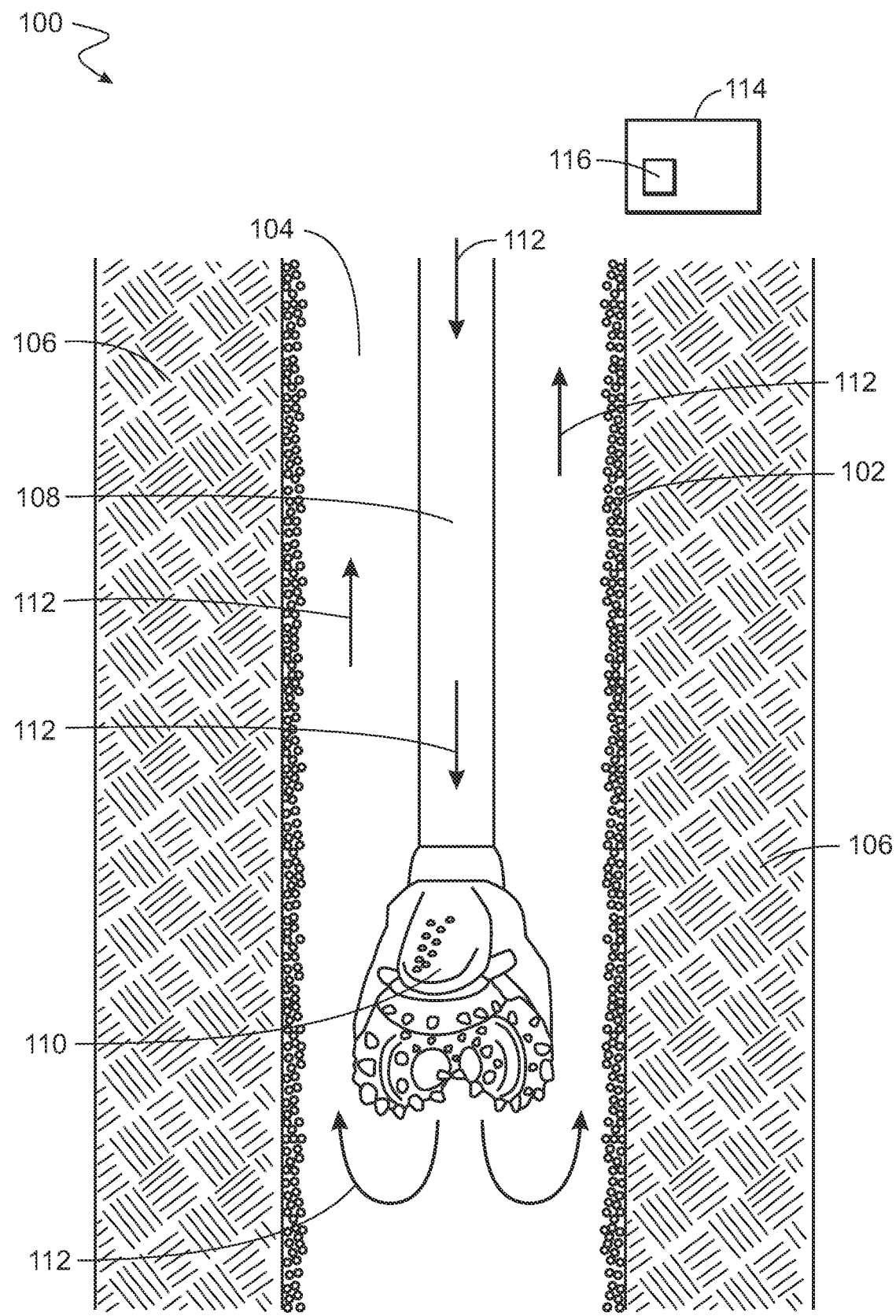
FIG. 1 is a diagram of a well having a filter cake.

Aspects of the present disclosure are directed to removing filter cake by the in-situ generation of acids via heat generated by a thermochemical reaction. In particular, to remove filter cake, encapsulated thermochemical materials (solid or liquid) (e.g., sodium nitrate and ammonium chloride) and encapsulated acid-generating materials (solid or liquid) are mixed with a carrier fluid (e.g., drilling fluid) pumped into the wellbore after the drilling operation is complete. In some implementations, these encapsulated materials may be incorporated into drilling fluid before the drilling operation is complete.

The reaction of the thermochemical(s) as additives may be activated (triggered) by downhole conditions (e.g., temperature) to generate heat to activate (trigger) the acid-generating material to generate acid to facilitate disintegration of the filter cake. The acid-generating materials may generate (form) in-situ acids (e.g., hydrofluoric acid, hydrochloric acid, etc.) that attack the filter cake. The heat generated by reaction of the thermochemicals may aid in removing filter cake (other than promoting reaction of the acid-generating material), for example, by facilitating hydrolyzing of polymer in the filter cake. The pressure generated by reaction of the thermochemicals may aid in removal of the filter cake by advancing mechanical degradation to the filter cake, and creating more surface areas compared to the case with no pressure. An increase in the surface area up to 20% more has been observed.

As for the encapsulation of the thermochemical reagents and encapsulation of the acid-generating material, the capsules (e.g., polymeric shells) may decompose at downhole conditions (e.g., temperature greater than 50° C.), releasing the thermochemical materials and the acid-generating materials that generate acid. The in-situ generated acid (along with optional chelating agent(s) in the carrier fluid) provide for breaking and removing filter cake to create a conductive path between the formation and wellbore. Components, such as chelating agents, may also be encapsulated. The Example below employing thermochemicals and acid-generating material in water-based drilling fluid removed the barite filter cake after two days with a removal efficiency of 95 weight percent (wt %) of the barite filter cake.

A drilling fluid is typically utilized to drill a borehole to form a wellbore. The drilling fluid may be a water-based drilling fluid. Filter cake may be formed along the wellbore wall (formation face) from solids in the drilling fluid. In embodiments of the present techniques, additives for treating (e.g., attacking, degrading, dissolving, removing, etc.) the filter cake in the wellbore are added to the drilling fluid before and/or after the drilling is completed.

The additives (e.g., as an additive package or additive composition) may be added to the drilling fluid before the drilling operation is complete. For example, the drilling fluid may have the additive for treating filter cake during the final 24 hours, 36 hours, or 48 hours of drilling before the drilling operation is complete. Therefore, in these implementations, in the last hours of the drilling operation, the additives for treating the filter cake are incorporated into the filter cake (during drilling) as the last layers or remaining portions of the filter cake formed from the solids in the drilling fluid. Some or all of the filter-cake treatment additives incorporated into the filter cake prior to drilling completion may be activated after the drilling operation is complete. Reactions of the thermochemicals and reactions of the acid-generating material can be delayed by the encapsulation. Further, in implementations, a retarding system as part of the filter-cake treatment composition included in the drilling fluid may slow reaction of the hydrofluoric acid with the filter cake.

For the drilling fluid pumped into the wellbore after drilling is complete, the encapsulation may prevent instantaneous reaction of the additives and thus beneficially provide for better distribution of the additives (thermochemicals, acid-generating material, chelating agents, etc.) along the wellbore. The additives may be added to the drilling fluid after drilling. In implementations, the drilling fluid may be generally unchanged other than the addition of the additives. The additives for treating the filter cake may be included in (added to) the drilling fluid after the drilling operation is complete. The drilling fluid having the additives may be utilized as a treatment fluid to treat the filter cake post-drilling. After drilling, the drilling fluid utilized to remove the filter cake may still have the solids used to form the filter cake during drilling, but those solids are suspended in the drilling fluid. After drilling is complete, the drilling fluid having the additives for treating the filter cake may be pumped (e.g., via a mud pump) through the drill string and drill bit (not in a drilling operation) into the wellbore to reach the filter cake. On the other hand, the drill string and drill bit may be removed (raised) from the wellbore, and the drilling fluid having the additive package pumped (e.g., via a mud pump or other pump) into the wellbore to treat the filter cake.

Whether before completion of the drilling and/or after completion of the drilling, the additives as an additive package or treatment composition (filter-cake treatment composition) may be added to (incorporated in) the drilling fluid to treat (attack, degrade, dissolve) the filter cake to remove at least a portion of the filter cake from the wellbore wall (formation face) with the drilling fluid having the additives.

The additives may include encapsulated thermochemical reagents to generate heat. The thermochemical reagents may include, for example, sodium nitrite ($NaNO_2$) or ammonium chloride ($NH_4Cl$), or both. The additives may include encapsulated acid-generating materials to generate acid, such as hydrofluoric acid (HF) or hydrochloric acid (HCl), or both. The additives may include chelating agents to attack the filter cake. The chelating agent(s) can be encapsulated. The additives may include a retarding system [e.g., components including aluminum chloride ($AlCl_3$) and nanosilica] to retard (slow, delay) reaction of the HF with the filter cake. In implementations, the $AlCl_3$ and nanosilica need not be encapsulated. The $AlCl_3$ and nanosilica may be added to retard the HF reaction with the quartz in the filter cake to advance more uniform and increased dissolution of the filter cake along the wellbore.

The encapsulation (capsules) may decompose at the downhole conditions and thus release the thermochemical reagents and the acid-generating material. The thermochemical reaction of the thermochemical reagents generates heat. The heat promotes the reaction of the acid-generating material to generate acids, such as HF and HCl. The acid attacks (e.g., degrades, dissolves, etc.) the filter cake along the formation face that is the wall of the wellbore. The acid, along with any chelating agents added to the drilling fluid, can break and remove the filter cake and create a conductive path between the formation and wellbore.

The acid is formed in-situ in the wellbore from the acid-generating material at the downhole conditions including with aid of the heat generated by reaction of the thermochemical reagents. The acid-generating material may generate (form) hydrogen fluoride that gives the hydrofluoric acid (HF) in the aqueous environment of the filter cake. The acid-generating material may generate (form) hydrogen chloride giving the hydrochloric acid (HCl) in the aqueous environment of the filter cake.

The in-situ acids, such as HF and HCl, in addition to chelating agent(s), can remove and break different types of filter cakes, such as filter cakes including [1] barite, [2] barite and quartz (barite/calcite filter cake), [3] barite and calcite (barite/calcite filter cake), and [4] calcite and quartz (calcite/quartz filter cake). Such may be applied in vertical, directional, and horizontal wells (wellbores). The in-situ generated acids and chelating agents can be applied for filter cake removal in wellbores, for example, in carbonate and/or sandstone reservoirs (formations).

As for the encapsulation, the capsules may be polymeric shells that contain an inner core of the thermochemical materials (solids or liquids) and polymeric shells that contain an inner core of in-situ acid-generating materials (solids or liquids). The capsules as a polymeric shell (e.g., as a coating) may be water insoluble at low temperatures (e.g., less than 50° C.), generally non-porous, and substantially free of silicon, phosphorus, fluorine, bromine, chlorine, sulfur, and chemical crosslinker. The polymer shell may dissolve, for example, at 300° F. in about 30 minutes. The polymeric shell can be a homopolymer or copolymer, and in which the repeating units or monomers are connected by bonds that are not carbon-carbon covalent bonds and that tend to have a lower thermostability. The polymer may be, for example, poly(tert-butyl acrylate), poly(tert-butyl vinyl ether), poly(4-ethoxystyrene), poly(ethylene terephthalate), poly(2-hydroxypropyl methacrylate), polyvinylidene, poly (isopropyl methacrylate), poly(phenylene vinylene), poly (phenyl vinyl ketone), poly(vinyl pivalate), and poly(vinyl cyclohexanoate). Encapsulation may be implemented to control the release time of the encapsulated reactants and avoid instantaneous reaction of the encapsulated reactants. The encapsulation (polymer shells) can be configured to decompose by downhole temperature. The downhole temperature may be the wellbore temperature at the targeted depth. The downhole temperature may be the reservoir temperature (subterranean formation temperature).

The polymer capsules (shells, coating) as the encapsulation may be microcapsules in having a size (diameter, width, particle size), for example, in the range of 10 to 100 microns. The thickness of the encapsulation (capsules, shells, coating) may be, for example, in the range of 1 to 10 microns, or in the range of 2 to 5 microns. The thickness of the encapsulation may be varied, such as to affect the duration needed to dissolve the encapsulation. In one implementations, the capsules are made of a polymeric shell with an average thickness of 2 microns and the size of the capsule ranges from 10 to 100 microns.

Well cleanup may be an early or first (initial) stage in well completion operations. In well cleanup, the filter cake formed from solids in the drilling fluid may be removed. The filter cake may be formed during the drilling of the well in the overbalanced drilling operations due to the positive difference between the hydrostatic drilling fluid pressure and reservoir pressure. This pressure difference may lead to forming an impermeable filter cake (e.g., a relatively thin layer). The positive pressure difference between the wellbore and reservoir during drilling drives solids from the drilling fluid into the subterranean formation giving the filter cake at the formation face (wellbore wall). The formation of the filter cake on the face of the permeable formation may depend on several parameters of drilling fluids such as weightage of solid particles, composition, rheology, additives, differential pressure, and formation mineralogy In the subsequent production phase after well completion, the filter cake would prevent or reduce flow of hydrocarbon (e.g., crude oil and natural gas) from the reservoir (subterranean formation) into the wellbore. Thus, this drilling fluid residue (generally impermeable thin layer or filter cake) should be removed during the well cleanup operations to allow during subsequent hydrocarbon production for the reservoir fluids to flow from the reservoir into the wellbore and then (e.g., through wellbore production tubing) to the surface to the surface.

The drilling fluid also may cause damage to the reservoir due to the invasion of its base fluid (water or oil) and some of the weighting materials, polymers, etc. These ingredients of the drilling fluid (weighting materials, base fluid, polymers, etc.) may flow through the reservoir until the filter cake is formed. The flow of these ingredients to the reservoir may form a layer of reduced permeability around the wellbore. This layer may be called skin. The filter-cake formation may damage the formation with such labeled as skin damage. This skin is different from filter cake in that the term skin represents the damage in the subterranean formation due to the drilling fluid invasion. Drilling fluid invasion may reduce the near-wellbore permeability and this may cause what is called positive skin. Embodiments here may remove or mitigate skin in that the high pressure generated from the thermochemical reaction may force some of the treatment fluid (drilling fluid having additives for filter cake removal) to invade the formation and react or interact with the damage (and thus remove or mitigate the damage). In addition to the skin damage, other damaging mechanisms can be introduced during the drilling process, such as wettability alteration in the near-wellbore region, the formation of emulsion, and clay swelling. Embodiments herein may address this damage including wettability alteration, and the damage due to clay swelling because, for example, generated salts can stabilize clays.

The problem of well cleanup may be more challenging in horizontal wells compared to vertical wells. This can be attributed to the longer contact between the drilling fluid and the reservoir section during horizontal drilling. The thin layer of impermeable filter cake may impose an additional resistance to the formation fracturing (e.g., hydraulic fracturing) especially in long and extended reach horizontal well. The horizontal well length may reach, for example, to 20,000 feet and this may make uniform removal of filter cake difficult. The well cleanup may be more difficult in horizontal with conventional acid treatment of filter cake (which may be heterogeneous) because the acid may be consume initially upstream in a relatively small portion of the wellbore. Embodiments herein with the encapsulated acid-generating material can address this because acid generated may more readily reach substantially along the entire wellbore length for the acid to react with the filter cake.

FIG. 1 is a well 100 having a filter cake 102. The filter cake 102 is depicted as particles of exaggerated size for emphasis and clarity. The well 100 includes a wellbore 104 (borehole) formed in a subterranean formation 106 via a drill string 108 and drill bit 110. The face of the formation 106 is formed by drilling is the wellbore 104 wall. A drill string 108 and drill bit 110 are disposed in the wellbore 104. In the drilling operation, drilling fluid 112 is injected (pumped) into the drill string 108. The drilling fluid 112 may be pumped, for example, by mud pumps from the Earth surface into the drill string 108 in the wellbore 102.

The well site of the well 1500 may include surface equipment 114, such as a mounted drilling rig, piping, storage tanks, and so on, at the Earth surface (adjacent or near the wellbore 104). The surface equipment may include the aforementioned mud pumps 116. The mud pumps 116 may be, for example, centrifugal pumps, positive displacement pumps, reciprocating pumps, piston pumps, etc.

The wellbore 104 diameter may be, for example, in a range from about 3.5 inches (8.9 centimeters) to 30 inches (76 centimeters), or outside of this range. The depth of the 102 can range from 300 feet (100 meters) to more than 30,000 feet (9,100 meters). The wellbore 104 can be vertical, horizontal, or deviated, or any combinations thereof. Filter cake formation 102 can be significant in horizontal wellbores 104 (or horizontal portion of the wellbore 104). Once the wellbore 102 is drilled, the wellbore 102 may be completed.

To form the wellbore (hole, borehole) in the ground, the drill bit 110 (having cutters) may be lowered into the wellbore 104 and rotated to break the rock of the formation 104. In the rotation, the cutters may interface with the formation 106 to grind, cut, scrape, shear, crush, or fracture rock to drill the hole. The drill bit 110 may be a component of the drill string 108 or coupled to the drill string 108. The drill bit 110 may be lowered via the drill string 108 into the wellbore 104 (borehole) to drill the wellbore 104 into the subterranean formation 106 in the Earth crust. In a drilling operation, the drilling fluid 112, also known as drilling mud, is circulated down the drill string 108 and through multiple nozzles in the drill bit 110 to the bottom of the wellbore 104. The drilling fluid 112 may then flow upward towards the surface through an annulus between the drill string 108 and the wall of the wellbore 104. The drilling fluid 112 may cool the drill bit 110, apply hydrostatic pressure upon the formation 106 penetrated by the wellbore 104 to prevent or reduce fluids from flowing into the wellbore 102, reduce the torque and the drag force induced by the friction between the drill string 108 and the wellbore 104 wall, carry the formation cuttings up to the surface, and so forth.

The filter cake 102 may be formed via the circulating drilling fluid 112. Solids from the drilling fluid 112 (a slurry) may build on the surface (face) of the formation 106 (wellbore 104 wall) as the filter cake 102. The filter cake 102 may form as solids of the drilling fluid 112 slurry deposited on permeable portions of the formation 106 face under wellbore 104 pressure. Initially, as the filter cake 102 is being deposited on the surface of the permeable formation 106, the permeable formation 106 serves as a filter allowing liquid portions (filtrate) of the drilling fluid 112 to pass through and trapping the insoluble solid portion as a cake. Over time, enough filter cake gathers on the surface of the porous formation 106, allowing little or no further liquid invasion. The drilling fluid 112 may be configured for formation of the filter cake 102. This filter cake 102 may be deposited on the porous rocks under overbalance pressure conditions. The formation of filter cake 112 may prevent or reduce further loss of drilling fluid 112 into the formation 106 and reduce solid invasion as well. In other words, the filter cake 112 may help prevent loss circulation and formation damage that would be caused by fines and filtrate invasion into reservoir rocks. A filter cake 102 that is relatively thin and with low permeability may generally be desirable. However, it may typically be desirable to degrade or remove the filter cake 102 prior to primary cementing (if employed) and hydrocarbon production.

The aforementioned additives for treating (e.g., removing) the filter cake 102 may be included in the drilling fluid 112 (e.g., via the surface equipment 114) before the drilling operation is complete, such as at least 6 hours (e.g., 6 hours to 36 hours) before the drilling operation is complete or at least 24 hours (e.g., 24 hours to 48 hours) before the drilling operation is complete. Therefore, the additives (encapsulated materials) may be deposited in the filter cake during drilling. In implementations, encapsulation of the additives (treatment components) may not dissolve releasing the additives until the drilling is complete. In implementations, the thickness of the encapsulation can be specified in response to a specified time or duration for dissolution of the encapsulation.

The filter-cake treatment additives may be added to the drilling fluid 112 after drilling. These additives for treating the filter cake may be included in (added to) the drilling fluid 112 (e.g., via the surface equipment 114) after the drilling operation is complete. The drilling fluid having the additives may be utilized as a treatment fluid to treat the filter cake 102 post-drilling. After drilling is complete, the drilling fluid 112 having the additives for treating the filter cake 102 may be pumped (e.g., via mud pump 116) through the drill string 108 and drill bit 110 (e.g., but not in a drilling operation) into the wellbore 104 to reach the filter cake 102. On the other hand, the drill string 108 and drill bit 110 may be removed (raised) from the wellbore 104, and the drilling fluid 112 (as having the additives for treating the filter cake 102) pumped (e.g., via mud pump 116 or other pump) into the wellbore 104 to treat the filter cake 102.

While the delivery of the encapsulated acid-generating material and encapsulated thermochemicals may be targeted to a particular depth in the wellbore, the entire wellbore (the portion(s) having filter cake) may generally be targeted. The injection of the drilling fluid having the filter-cake treatment composition may generally applied throughout the wellbore. The thermochemical reaction and in-situ generation of acid generally may occur throughout the depth of the wellbore (along the wellbore wall having the formed filter cake).

The thermochemical reagents (e.g., as encapsulated) added to the drilling fluid may include a nitrite-containing compound (e.g., $HNO_2$) that provides nitrite ions and/or an ammonium-containing compound (e.g., $NH_4Cl$) that provides ammonium ions. The nitrite-containing compound as a thermochemical reagent that provides nitrite ions can include, for example, sodium nitrite or potassium nitrite, or both. The concentration of the nitrite-containing compound in the drilling fluid can be, for example, less than 15 molar, or in the range of 0.5 molar to 10 molar (or 1 molar to 9 molar). The ammonium-containing compound as a thermochemical reagent that provides ammonium ions can include, for example, ammonium chloride, ammonium bromide, ammonium nitrate, ammonium nitrite, ammonium sulfate, ammonium carbonate, or ammonium hydroxide, or any combinations thereof. The concentration of the ammonium-containing compound in the drilling fluid can be, for example, less than 12 molar, or in the range of 0.5 molar to 8 molar (or 1 molar to 6 molar).

After decomposition of the polymeric encapsulation (e.g., in the aqueous solution), the reaction (thermochemical reaction) of the thermochemical reagents as an exothermic reaction that generates heat may be a reaction of the ammonium-containing compound with the nitrite-containing compound. The reaction may be activated by heat from the subterranean formation, such as triggered at temperatures greater than 120° F., e.g., in the range of 120° F. to 375° F. In the activation by temperature (heat), the drilling fluid, wellbore fluid, or environment of the filter cake may have a pH, for example, less than 11, 6, or 5, or in the ranges of 2 to 11, 2 to 6, 3 to 6, 2 to 5, or 3 to 5. The thermochemical reaction of the thermochemical reagents in the drilling fluid can be further activated by an acid (e.g., added to the drilling fluid). The presence of the acid (e.g., acetic acid or citric acid) may lower the pH of the drilling fluid, wellbore fluid, or environment of the filter cake to a pH, for example, less than 11, less than 6, or less than 5, or in the ranges of 2 to 11, 2 to 6, 3 to 6, 2 to 5, or 3 to 5.

For the example of the ammonium-containing compound as $NH_4Cl$ and the nitrite-containing compound as $HNO_2$, the reaction of these two thermochemical reagents may be expressed as in equation (1):

$$NH_4Cl + NaNO_2 \rightarrow NaCl + 2H_2O + N_2(gas) + \Delta H(heat) \quad (1)$$

The amount of heat ($\Delta H$) generated may be, for example, 75 kilocalories per mol. The reaction [equation (1)] may generate nitrogen ($N_2$) gas. The reaction may form sodium chloride (NaCl) and water ($H_2O$). This thermochemical reaction may also generate pressure.

In implementations, this generated pressure is generally not needed or required for promotion of the reactions of the acid-generating material that generates acid. The pressure increase due to (caused by) the thermochemical reaction, e.g., as with equation (1), may be, for example, in the range of 500 pounds per square inch (psi) to 2000 psi. While the initial peak pressure increase may be localized at the depth the thermochemical reaction occurs, the entire wellbore may generally experience the pressure increase.

Instead, heat generated by the thermochemical reaction activates (triggers, promotes) acid generation by the acid-generating material. The reaction of the acid-generating material to form acid may be activated, for example, by a temperature in a range of 250° F. to 450° F. (or in a range of 300° F. to 400° F.). The reaction of the thermochemical reagents, e.g., as with equation (1), may generate heat to give that temperature to activate the acid-generating material to form acid.

Thus, the reaction of thermochemical reagents, e.g., as in equation (1) may generate heat to initiate the reaction of the acid-generating materials in the capsules after decomposition, such as according equation (2) below. The acid-generating material (e.g., as encapsulated and incorporated into the drilling fluid) may include ammonium fluoride ($NH_4F$)

and an oxidizer that reacts to generate HF. The oxidizer may be, for example, bromate or persulfate, or both. The bromate may be, for example, sodium bromate (NaBrO$_3$) or potassium bromate, or both. An example of a reaction of the acid-generating material (initiated by heat from the thermochemical reaction) to form HF is given in equation (2):

$$2NH_4F+NaBrO_3+\Delta H(heat) \rightarrow 2HF+NaBr+3H_2O+N_2 \quad (2)$$

Thus, with acid-generating material, as indicated in equation (2), the ammonium fluoride may react with a relatively strong oxidizer (e.g. sodium bromate) utilizing heat resulting from the thermochemical reaction to generate HF acid in-situ in the wellbore. Sodium bromide (NaBr), water, and nitrogen are generated (formed) in addition to the HF in the particular example of equation (2).

The acid-generating material can include NH$_4$Cl and an oxidizer that react to form HCl. The oxidizer may be, for example, bromate or persulfate, or both. The bromate may be, for example, sodium bromate (NaBrO$_3$) or potassium bromate, or both. An example of a reaction of acid-generating material (initiated by heat from the thermochemical reaction) to form HCl is given in equation (3):

$$2NH_4Cl+NaBrO_3 \rightarrow 2HCl+NaBr+3H_2O+N_2 \quad (3)$$

Thus, with acid-generating material, as indicated in equation (3), the ammonium chloride may react with a relatively strong oxidizer (e.g. sodium bromate) utilizing heat resulting from the thermochemical reaction to generate HCl acid in-situ in the wellbore. Sodium bromide (NaBr), water, and nitrogen are generated (formed) in addition to the HCl in the particular example of equation (3).

As acid-generating material, the ammonium chloride may be provided with the oxidizer and/or separately provided by an excess of ammonium chloride as a thermochemical reagent. The oxidizer (e.g., NaBrO$_3$) may be provided with the ammonium chloride and/or separately as an excess of oxidizer (e.g., NaBrO$_3$) provided with the acid-generating material including ammonium fluoride.

In cases in which both HF and HCl are formed from acid-generating material (e.g., both equation (2) and equation (3) are implemented), the acid-generating material may include ammonium hydrogen difluoride [(NH$_4$)HF$_2$] (also called ammonium bifluoride). Thus, in the case of both HCl and HF acids to be generated in-situ, the reaction in equation (2) can be supplemented or replaced by the following reaction:

$$HCl+(NH_4)HF_2 \rightarrow NH_4Cl+2HF \quad (4)$$

The additives may include an HF retarding system (AlCl$_3$ and nanosilica) to retard (slow, delay) the reaction of the generated HF with quartz in the filter cake. Both the AlCl$_3$ and nanosilica may be adsorbed on the quartz surface and reduce the HF reaction with quartz. Such may delay the acid consumption and therefore advance more uniform removal of the filter cake along the wellbore. The retarding system may facilitate to have a more uniform reaction of the HF with the filter cake along the length of the wellbore. The nanosilica particles may have a particle size (diameter, width) less than 100 nanometers (nm), or in the ranges of 1 nm to 100 nm or 10 nm to 100 nm. The combination of the AlCl$_3$ and nanosilica retards the reaction of HF with quartz in the filter cake, for example, in the range of 30% to 60%, such as about half (50%). In other words, this retarding system (the combination of the AlCl$_3$ and nanosilica) may decrease the amount of reaction per time (or the reaction rate) of the HF with quartz by in the range of 30% to 60%, or may increase the amount of time for HF to react with a unit mass of quartz by in the range of 30% to 60%. The AlCl$_3$ may be included in the drilling fluid, for example, in the range of 0.3 wt % to 3 wt % of the drilling fluid. The nanosilica may be included in the drilling fluid, for example, in the range of 0.1 wt % to 1 wt %. AlCl$_3$ and nano silica can adsorb on the rock surface and reduce the HF reaction with quartz As mentioned, chelating agents may be included in the drilling fluid to attack the filter cake. The chelating agents may, for example, attack (degrade, disintegrate, dissolve) weight materials (weighting agents deposited from the drilling fluid) of the filter cake. The chelating agents may include, for example, ethylenediaminetetraacetic acid (EDTA), diethylenetriaminepentaacetic acid (DTPA), N,N-dicarboxymethyl glutamic acid (GLDA) (C$_9$H$_9$NO$_8$Na$_4$) (tetrasodium glutamate diacetate), hydroxyethylethylenediaminetriacetic acid (HEDTA), and trisodium dicarboxymethyl alaninate (MGDA) (C$_7$H$_8$NNa$_3$O$_6$).

At least four cases (Case 1, Case 2, Case 3, and Case 4) may be considered, as discussed below. The cases are given only as examples and not intended to limit the present techniques. Additional cases may be implemented.

The four cases are discussed with respect to FIGS. 2-5. The encapsulated materials (components) are depicted in a somewhat of an ordered or structured arrangement for clarity. However, the actual arrangement will be generally random in the drilling fluid and as incorporated into the filter cake. The polymer-encapsulated components may be placed in (incorporated into) (or otherwise disposed to attack) the filter cake as polymer particles in a more random arrangement and do not necessarily in the arrangements depicted in FIGS. 2-5.

Figure 2:
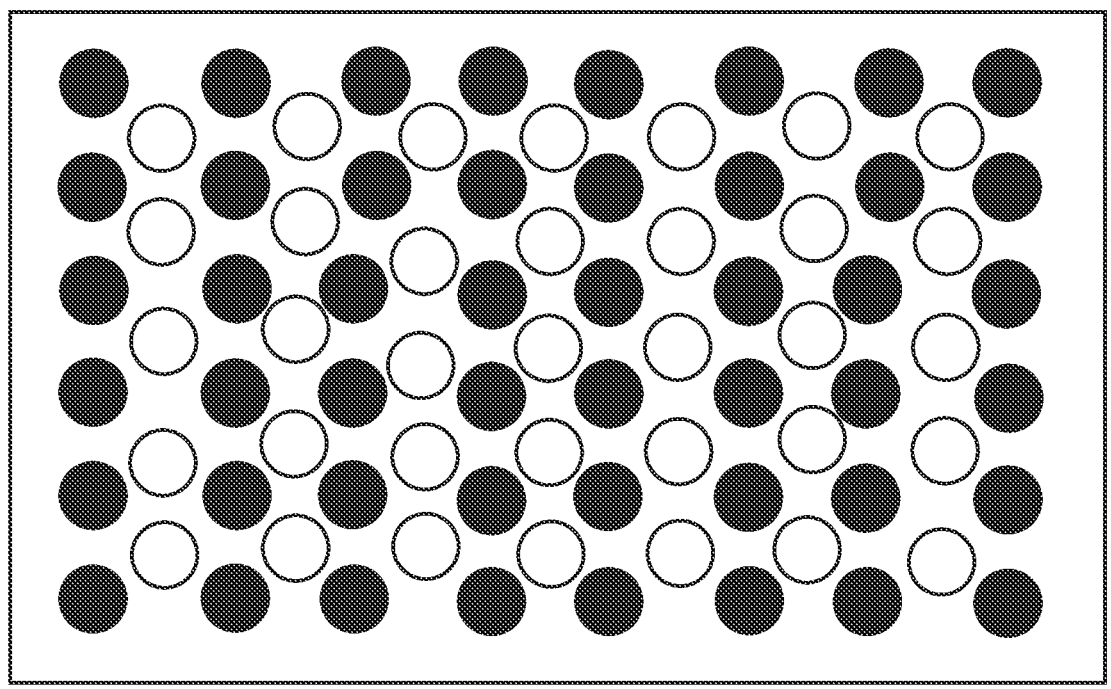
FIGS. 2-5 are diagrams of encapsulated materials that might be in the drilling fluid and in the filter cake.

FIG. 2 (for Case 1) is encapsulated materials that might be in the drilling fluid pumped into the wellbore (before and/or after the drilling operation is complete) and that may be place in (incorporated into) the filter cake along the wellbore during the filter-cake removal treatment. As noted in the legend to the right, the encapsulated materials include encapsulated thermochemicals 200 (encapsulated thermochemical reagents) and encapsulated acid-generating materials 202. As discussed, the encapsulation may be polymer, such as polymeric shells (polymer shells), polymeric capsules (polymer capsules), polymeric coating (polymer coating), etc.

The thermochemicals in the encapsulated thermochemicals 200 include an ammonium-containing compound (e.g., ammonium chloride) and a nitrite-containing compound (e.g. sodium nitrite) that react at the wellbore temperature. The reaction, e.g., as in the aforementioned equation (1), may occur after the decomposition of the polymeric encapsulation (e.g., shell) in the aqueous environment (solution) of the wellbore. This thermochemical reaction generates heat that initiates the reaction(s) of the acid-generating material as released from the encapsulated acid-generating material 202. The acid generated (in situ) may be HF or HCl, or both. See, e.g., the aforementioned equations (2), (3), and (4). The acid-generating material inside the encapsulation (capsules or shells) of the encapsulated acid-generating material 202 may include NH$_4$F, an oxidizer (e.g., bromate such as NaBrO$_3$), NH$_4$Cl, or (NH$_4$)HF$_2$, or any combinations thereof.

In Case 1, the acid generated in-situ may be utilized to treat (remove) various types of filter cake, such as (i) filter cake formed in sandstone formations while drilling with calcite-based drilling fluids and (ii) filter cake formed in carbonate formations while drilling with calcite-based drilling fluids. For the (i) filter cake formed in sandstone formations while drilling with calcite-based drilling fluids, in-situ generated HF may beneficially attack sand in the filter cake. For the (ii) filter cake formed in carbonate formations while drilling with calcite-based drilling fluids, the reactants for equation (1) and equation (3) may be encapsulated and their reactions implemented, while equations (2) and (4) may be avoided in implementations. Therefore, for implementations of treatment of this (ii) filter cake, HCl (and not HF) is generated. In the case of carbonate formations, HF generation may be avoided because generally there is little or no quartz in the filter cake.

During drilling sandstone formations, sand particles displaced from the formation may contaminate the drilling fluid and thus the formed filter cake may include sand, e.g., up to 30 wt % sand, as confirmed in the field. This high sand content in the filter cake may inhibit removal of the filter cake in conventional acid treatments. Conventional removal of filter cake formed from calcite-based drilling fluids may typically consider calcite but not sand.

Beneficially, in present embodiments, the generated HF may react with the sand particles, and the generated HCl may react with calcite. This may enhance the filter-cake removal efficiency compared to the conventional design. Again, the heat generated by the thermochemical reaction, e.g., equation (1), may initiate the acid-generating reactions to form the HF and HCl in-situ. In addition, the heat and pressure generated from the thermochemical reaction may break the filter cake and thus facilitate further removal of the filter cake, including decomposition any polymer in the filter cake.

Figure 3:
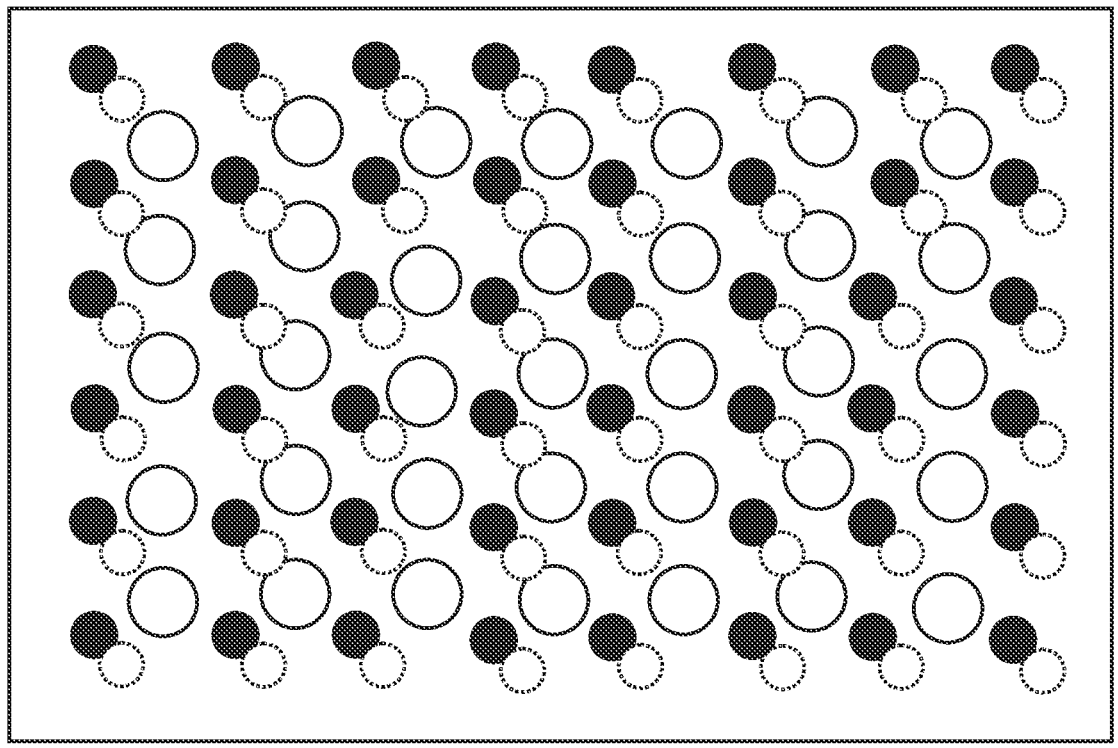

FIG. 3 (for Case 2) is encapsulated materials that might be in the drilling fluid pumped into the wellbore (before and/or after the drilling operation is complete) and that may be placed in (or otherwise disposed to attack) the filter cake along the wellbore wall during the filter-cake removal treatment. As noted in the legend to the right, the encapsulated components may be encapsulated thermochemical A 300, encapsulated (thermochemical B+acid) 302, and encapsulated acid-generating material 303. The encapsulated acid-generating material 303 may include the acid-generating material (reactants) discussed with respect to the aforementioned equations (2), (3), and (4). The acid with thermochemical B may be included to lower pH to facilitate the thermochemical reaction in the instance of inadequate temperature (too low of a temperature) downhole in the wellbore to activate (initiate, trigger) the thermochemical reaction. At lower wellbore temperatures, the thermochemical reaction may take place due to the lower pH.

The acid included with thermochemical B may be, for example, citric acid or acetic acid, or both. The concentration of this acid in the drilling fluid may be, for example, in the range of 1 wt % to 10 wt %, or in the range of 2 wt % to 5 wt %. Again, this acid may be included to lower pH, such as in instances in which wellbore temperature is inadequate to trigger the thermochemical reaction. Once the capsules decompose, the thermochemical reaction will take place due to the pH buffering effect of the acid. The thermochemical reaction may take place at acidic conditions, for example, at a pH less than 5, or in the range of 2 to 5.

The acid-generating material reaction(s) and treatment applications may typically be similar to Case 1. This design in Case 2 could be, for example, for low-temperature shallow sandstone and carbonate reservoirs.

The thermochemical A 300 and thermochemical B may include the thermochemical reagents discussed with respect to the aforementioned equation (1). In implementations, the thermochemical A 300 is a nitrite-containing compound (e.g., $NaNO_2$) and the thermochemical B is an ammonium-containing compound (e.g., $NH_4Cl$). In other implementations, the thermochemical A 300 is an ammonium-containing compound (e.g., $NH_4Cl$) and the thermochemical B is a nitrite-containing compound (e.g., $NaNO_2$).

Figure 4:
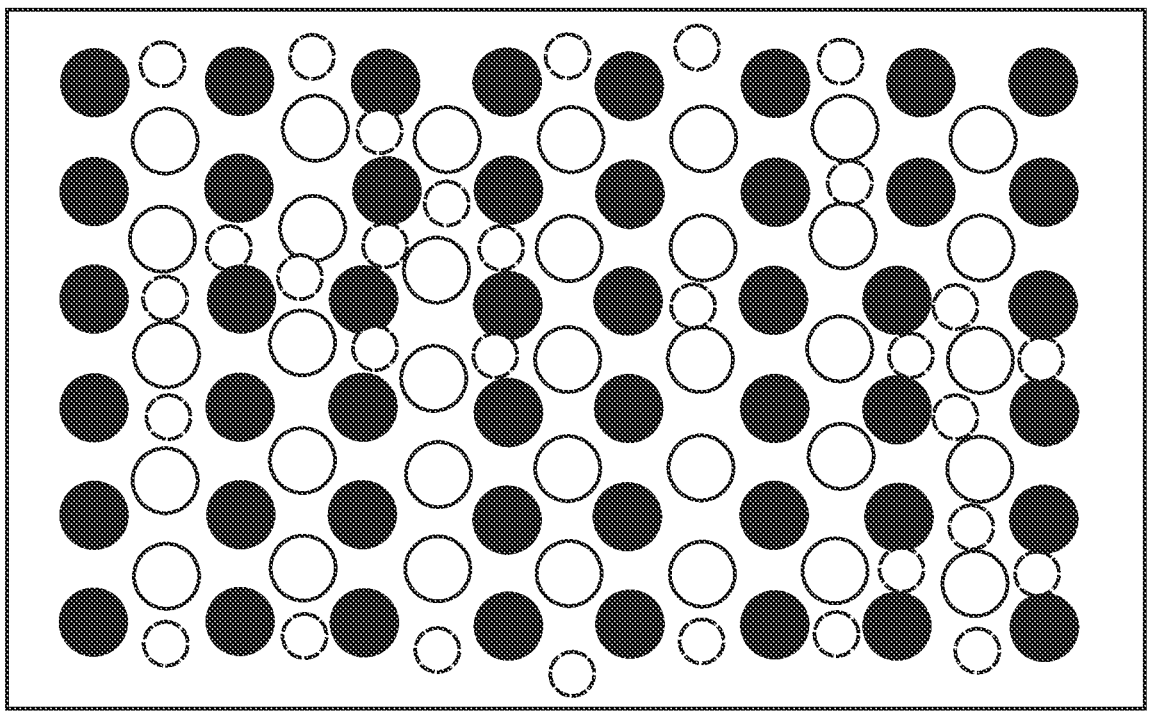

FIG. 4 (for Case 3) shows the formulation (encapsulated thermochemicals 200 and encapsulated acid-generating material 202) as in Case 1 but with the addition of encapsulated chelating agents 400, such as EDTA, DTPA, HEDTA, etc. Chelating agents may be included to remove barite filter cake. Barite filter cake may be formed, for example, during drilling sandstone and carbonate formations with barite-weighted drilling fluids (e.g., barite employed as a weighting agent in the drilling fluid). In Case 3, reactions [e.g., equations (1)-(4)] similar as in Case 1 may take place. The Case 4 treatment composition (formulation) for addition to drilling fluid can be utilized in drilling fluid (during drilling and/or as a treatment fluid after drilling) to remove filter cake, for example, in these two scenarios: (i) filter cake formed in sandstone formations drilled with barite-weighted drilling fluids; and (ii) filter cake formed in carbonate formations while drilling with barite-based drilling fluids. In treatment implementations of (ii), only reactions and encapsulated reactants generally according to equations (1) and (3) (and not equations (2) and (4)) are implemented.

In Case 3, the chelating agent(s) may remove barite from the filter cake, the in-situ generated HF may remove sand from the filter cake in scenarios of sandstone reservoirs, and the in-situ generated HCl may remove calcite and dolomite in the scenarios of carbonate formations.

In certain implementations of scenarios of carbonate formations drilled with barite-based drilling fluids, only thermochemical reagents and chelating agents (and no acid-generating material) are included (encapsulated), given that the chelating agent(s) may remove both carbonate and barite particles in the filter cake. In these certain implementations, the concentration of chelating agent(s) in the drilling fluid is at least 20 wt %, or in the range of 20 wt % to 40 wt %. A purpose of the thermochemicals (with or without presence of acid-generating material) can be to generate pressure and temperature that may enhance the reaction rate of chelating agents with the filter cake.

Figure 5:
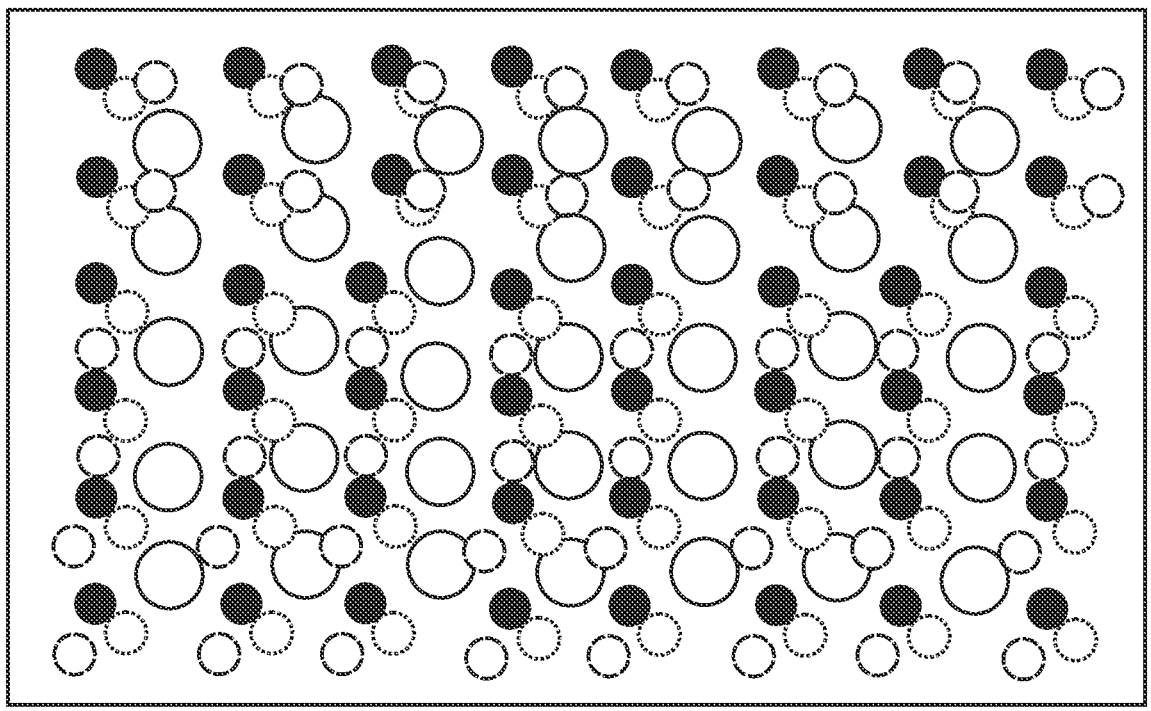

FIG. 5 (for Case 4) is encapsulated materials that might be in the drilling fluid pumped into the wellbore (before and/or after the drilling operation is complete) and that may be placed (or otherwise disposed to attack) in the filter cake along the wellbore wall during the filter-cake removal treatment. As noted in the legend to the right, the encapsulated components may be encapsulated thermochemical A 300, encapsulated (thermochemical B+acid) 302, and encapsulated acid-generating material 303 as in Case 2. The encapsulated materials may additionally include encapsulated chelating agent(s) 400 as in Case 3. As in Case 2, the acid with thermochemical B in Case 4 may be included to lower pH to facilitate the thermochemical reaction in the instance of inadequate temperature (too low of a temperature) downhole in the wellbore to activate (initiate, trigger) the thermochemical reaction. The thermochemical reaction at relatively low wellbore temperature (e.g., less than 150° F.) may take place at acidic conditions, for example, at pH less than 5, or in the range of 2 to 5.

In some implementations, the thermochemical A is $NaNO_2$, the thermochemical B is $NH_4Cl$, and the acid is citric acid or acetic acid, or both. All reactions according to the aforementioned equations (1), (2), (3), and (4) may be applied, depending on the implementation. Case 4 can be applied, for example, for low-temperature shallow sandstone and carbonate reservoirs drilled with barite-based drilling fluids.

The encapsulated materials discussed herein for treating (removing) filter cake can be added to the drilling fluid (e.g., water-based drilling fluid) having differing weighting agents. For example, the encapsulated materials can be added to water-based drilling fluid weighted by barite, calcite, ilmenite, or manganese tetraoxide, or any combinations thereof. The encapsulated materials can be employed during and after drilling various types of formations in vertical or horizontal wells. The encapsulated materials can be employed to degrade or remove filter cake formed from barite-based drilling fluids in which the filter cake includes barite, polymer, and sandstone from the drilling of sandstone formations. The encapsulated materials can be utilized to degrade or remove filter cake formed in barite-based drilling fluids in which the filter cake includes barite, polymer, calcite formed from drilling limestone formations. The encapsulated materials can be utilized to degrade or remove filter cake formed from barite-based drilling fluids in which the filter cake include barite, polymer, dolomite formed in drilling dolostone formations. The encapsulated materials can be used to degrade or remove filter cake formed from barite-based drilling fluids in which the filter cake includes barite, polymer, calcite, dolomite from the drilling of carbonate formations.

The encapsulated materials can be utilized to degrade or remove filter cake formed from calcite-based drilling fluids. The encapsulated materials can be employed to attack and remove the filter cake formed from ilmenite-based drilling fluids in the drilling if sandstone and carbonate formations. The encapsulated materials can be used to remove the filter cake formed in manganese tetra oxide-based drilling fluids in the drilling of sandstone and carbonate formations The encapsulated materials may be released from the capsules at relatively high temperatures after the drilling operation is over. Dissolution of the polymer capsules (encapsulation) could be over a time period (duration) in the range of 2 days to 7 days, depending on the capsule shell thickness. In implementations, the thickness of the capsules for the thermochemicals may be generally the same as the thickness of the capsules for the acid-generating material, and typically broken at the same temperature. This may facilitate that the encapsulated materials (additives) for treating filter cake can be deposited in the filter cake in the last days or hours of the drilling, but the encapsulated materials not released from the encapsulation until after the drilling is complete.

As for the encapsulation, the polymeric shell may be soluble in water at high temperatures, such as at least 50° C. The released thermochemical reagents may react by the acid buffering effect or by temperature at which the acid-generating materials react, or a combination thereof. The heat generated by the generate HF acid, HCl acid, that will react with quartz and calcite in the filter cake. Again, the chelating agent (e.g., EDTA, DTPA, etc.) may remove barite from the filter cake.

Treating (attacking, degrading, or dissolving) the filter cake in the treatment can mean to remove most or all of the filter cake. Treating (attacking, degrading, or dissolving) the filter cake in the treatment can mean to remove a portion of the filter cake giving permeability (porosity) in the filter cake for flow of fluids through the filter cake between the wellbore and the subterranean formation.

Figure 6:
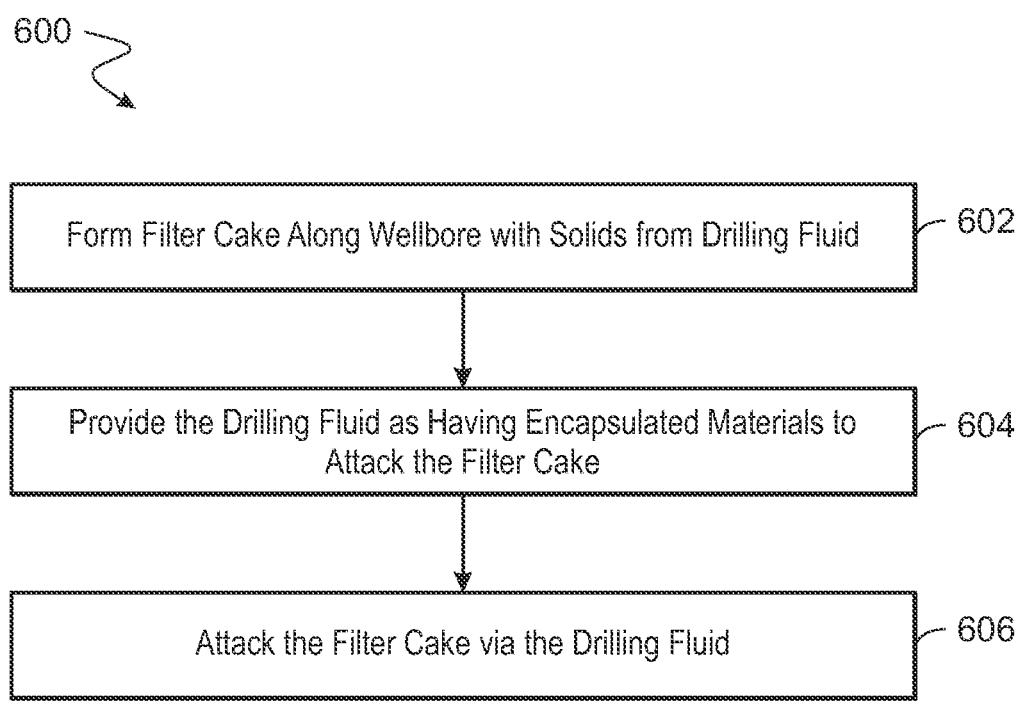
FIG. 6 is a block flow diagram of a method of treating a wellbore for filter cake removal.

FIG. 6 is a method 600 of treating a wellbore for filter cake removal. The wellbore may be formed through the Earth surface into a subterranean formation in the Earth crust. Embodiments are applicable to various types of subterranean formations, as discussed. The composition of the additives included in the drilling fluid for treating the filter cake can be adjusted depending on the type of subterranean formation, as also previously discussed.

At block 602, the method includes forming filter cake along the wall (formation face) of a wellbore with solids from a drilling fluid utilized to drill the wellbore. The filter cake may also include solids or particles displace from the subterranean formation during the drilling.

At block 604, the method includes providing the drilling fluid (e.g., an aqueous drilling fluid) as having encapsulated materials into the wellbore to attack the filter cake in the wellbore. The encapsulated materials include thermochemical reagents that are encapsulated and acid-generating material that are encapsulated to provide for attacking the filter cake. The providing of the drilling fluid may include drilling the wellbore with the drilling fluid having the encapsulating materials and therefore the encapsulated materials may be deposited in the filter cake during the drilling. The providing of the drilling fluid may involve providing the drilling fluid having the encapsulated materials into the wellbore during a drilling operation forming the wellbore and the filter cake or after completion of the drilling operation, or both.

In implementations, the acid generating material may include ammonium fluoride ($NH_4F$), an oxidizer (e.g., bromate), ammonium chloride ($NH_4Cl$), or ammonium hydrogen difluoride [$(NH_4)HF_2$], or any combinations thereof. The thermochemical reagents may react in the wellbore, thereby generating heat that activates the acid-generating material to generate acid in-situ in the wellbore. The thermochemical reagents may include an ammonium-containing compound and a nitrite-containing compound that react to generate heat. Again, the heat may activate (trigger) the acid-generating material to form acid (e.g., HF or HCl, or both) in the wellbore. In implementations, the drilling fluid may include $AlCl_3$ and nanosilica to retard generation of the HF by the acid-generating material.

At block 606, the method includes attacking the filter cake via the drilling fluid. The attacking of the filter cake via the drilling fluid may remove at least a portion of the filter cake from the wellbore. The attacking of the filter cake may involve degrading the filter cake and/or dissolving at least a portion of the filter cake. The attacking of the filter cake via the drilling fluid may involve the acid-generating material generating acid (e.g., HF or HCl, or both) that attacks the filter cake. The attacking of the filter cake via the drilling fluid may include a chelating agent in the drilling fluid attacking the filter cake.

Figure 7:
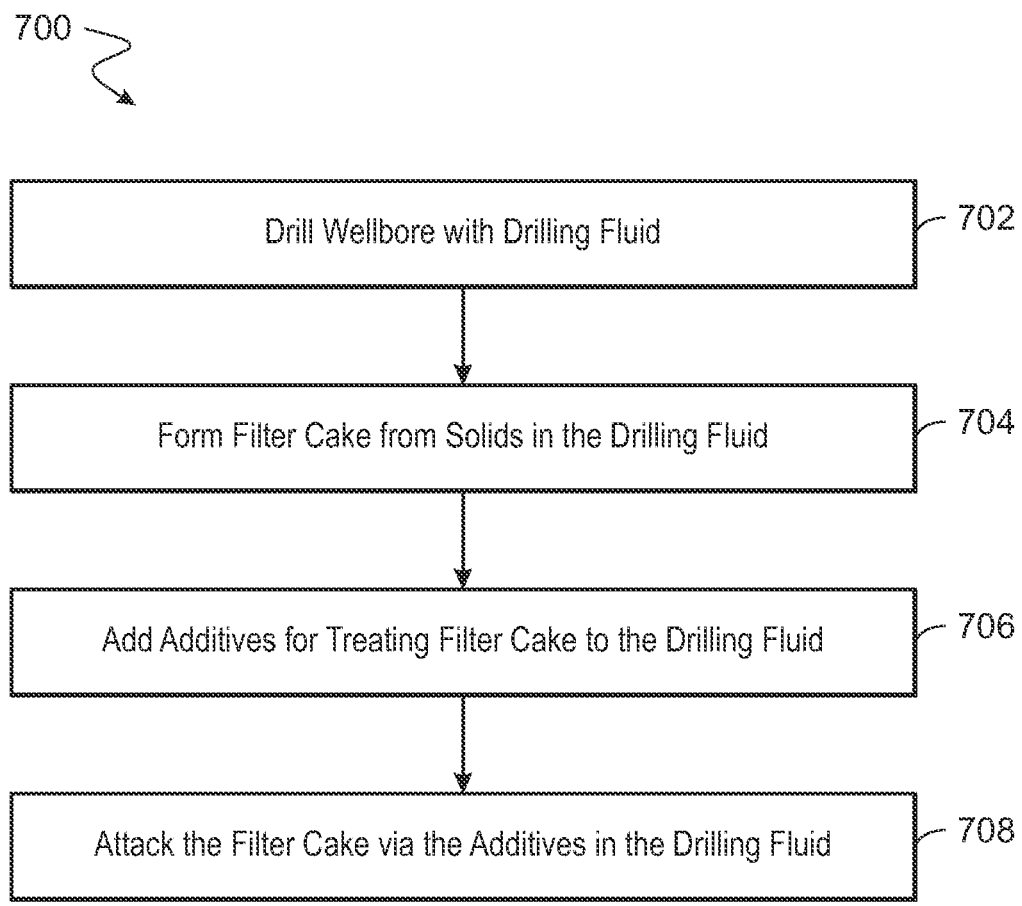
FIG. 7 is a block flow diagram of a method of drilling a wellbore and treating filter cake.

FIG. 7 is a method 700 of drilling a wellbore and treating filter cake (in the wellbore). At block 702, the method includes drilling the wellbore in a subterranean formation with a drilling fluid. The drilling fluid may be, for example, a water-base drilling fluid.

At block 704, the method includes forming filter cake along a wall of the wellbore from solids in the drilling fluid. The solids may be included in the drilling fluid so that the filter cake forms.

At block 706, the method includes adding additives for treating filter cake to the drilling fluid. The additives include thermochemical reagents that are encapsulated and acid-generating material that is encapsulated. The additives for treating the filter cake may be added to the drilling fluid before completion of the drilling (block 702) that forms the wellbore, and wherein the additives are deposited in the filter cake during the drilling (block 704). The additives for treating the filter cake may be added to the drilling fluid after completion of the drilling (block 702) that forms the wellbore, and wherein the drilling fluid having the additives is pumped into the wellbore to attack the filter cake. The acid-generating material may include, for example, ammonium fluoride ($NH_4F$), an oxidizer, ammonium chloride ($NH_4Cl$), or ammonium hydrogen difluoride [$(NH_4)HF_2$], or any combinations thereof. The thermochemical reagents may react in the wellbore, thereby generating heat that activates the acid-generating material to generate acid in-situ in the wellbore. The thermochemical reagents may include an ammonium-containing compound and a nitrite-containing compound that react (a thermochemical reaction) to generate heat that activates (triggers) the acid-generating material to form acid. The method may include generating HF in the wellbore with the acid-generating material, wherein the additives include aluminum chloride ($AlCl_3$) and nanosilica that retard generation of the HF by the acid-generating material.

At block 708, the method includes attacking the filter cake via the additives in the drilling fluid. The attacking the filter cake via the additives may involve the thermochemical reagents reacting in the wellbore, thereby generating heat that activates the acid-generating material to generate acid that attacks the filter cake. Thus, the attacking of the filter cake via the additives may include attacking the filter cake with acid (e.g., HF or HCl, or both) generated by the acid generating material. The attacking the filter cake via the additives may involve attacking the filter cake with a chelating agent, wherein the additives include the chelating agent.

An embodiment is a method of treating a wellbore for filter cake removal, including providing a drilling fluid (e.g., an aqueous drilling fluid) having thermochemical reagents that are encapsulated and acid-generating material that is encapsulated into a wellbore in a subterranean formation to attack filter cake in the wellbore, and attacking (e.g., degrading) the filter cake via the drilling fluid. The method may include forming the filter cake from solids in the drilling fluid. The thermochemical reagents may include an ammonium-containing compound and a nitrite-containing compound that react to generate heat. The attacking of the filter cake may include dissolving at least a portion of the filter cake. At least a portion of the filter cake may be removed from the wellbore by the attacking of the filter cake via the drilling fluid. The attacking of the filter cake via the drilling fluid may include the acid-generating material generating acid (e.g., HCl) that attacks the filter cake. In implementations, the acid-generating material generates HF in the wellbore, wherein attacking the filter cake via the drilling fluid involves attacking the filter cake (including quartz) with the HF, and wherein the drilling fluid includes aluminum chloride ($AlCl_3$) and nanosilica to retard attack by the HF of the filter cake. The providing of the drilling fluid may include providing the drilling fluid into the wellbore during a drilling operation forming the wellbore and the filter cake or after completion of the drilling operation, or both. In implementations, the method may include drilling the wellbore with the drilling fluid having the thermochemical reagents that are encapsulated and the acid-generating material that is encapsulated, wherein the thermochemical reagents that are encapsulated and the acid-generating material that is encapsulated are deposited in the filter cake during the drilling. The drilling fluid may include a chelating agent, and wherein attacking the filter cake via the drilling fluid includes attacking the filter cake with acid generated by the acid-generating material and with the chelating agent. In implementations, the thermochemical reagents react in the wellbore, thereby generating heat that activates the acid-generating material to generate acid in-situ in the wellbore, and wherein the acid-generating material includes ammonium fluoride ($NH_4F$), an oxidizer, ammonium chloride ($NH_4Cl$), or ammonium hydrogen difluoride [$(NH_4)HF_2$], or any combinations thereof.

Another embodiment a method of drilling a wellbore and treating filter cake, including drilling the wellbore in a subterranean formation with a drilling fluid, forming filter cake along a wall of the wellbore from solids in the drilling fluid, and adding additives for treating filter cake to the drilling fluid, wherein the additives include thermochemical reagents that are encapsulated and acid-generating material that is encapsulated. The method includes attacking the filter cake via the additives in the drilling fluid. The forming of the filter cake may include forming the filter cake including the thermochemical reagents as encapsulated and the acid-generating material as encapsulated. The method may include generating HF in the wellbore with the acid-generating material, wherein attacking the filter cake via the additives includes attacking quartz in the filter cake with the HF, wherein the additives comprise aluminum chloride ($AlCl_3$) and nanosilica that retard the HF attacking the quartz. In implementations, the additives for treating the filter cake may be added to the drilling fluid before completion of the drilling that forms the wellbore, and wherein the additives are deposited in the filter cake during the drilling. The additives for treating the filter cake may added to the drilling fluid after completion of the drilling that forms the wellbore, and wherein the drilling fluid having the additives is pumped into the wellbore to attack the filter cake. The attacking of the filter cake via the additives may involve attacking the filter cake with acid (HF or HCl, or both) generated by the acid-generating material. The drilling fluid may include a chelating agent, and wherein attacking the filter cake via the additives includes attacking the filter cake with the chelating agent. The attacking of the filter cake via the additives may involve the thermochemical reagents reacting in the wellbore, thereby generating heat that activates the acid-generating material to generate acid that attacks the filter cake, and wherein the thermochemical reagents include an ammonium-containing compound and a nitrite-containing compound. The thermochemical reagents may react in the wellbore, thereby generating heat that activates the acid-generating material to generate acid in-situ in the wellbore, and wherein the acid-generating material includes ammonium fluoride ($NH_4F$), an oxidizer, ammonium chloride ($NH_4Cl$), or ammonium hydrogen difluoride [$(NH_4)HF_2$], or any combinations thereof.

Yet another embodiment is a drilling fluid including solids to form a filter cake along a wall of a wellbore, the drilling fluid configured to be utilized to drill the wellbore. The drilling fluid includes thermochemical reagents that are encapsulated, wherein the thermochemical reagents include an ammonium-containing compound and a nitrite-containing compound to react with each other to generate heat. The drilling fluid includes acid-generating material that is encapsulated, the acid-generating material to be activated by the heat to generate acid in the wellbore to attack the filter cake, and wherein the acid includes hydrofluoric acid (HF) or hydrochloric acid (HCl), or a combination thereof. In implementations, the ammonium-containing compound may be ammonium chloride, ammonium bromide, ammonium nitrate, ammonium nitrite, ammonium sulfate, ammonium carbonate, or ammonium hydroxide, or any combinations thereof. The nitrite-containing may be, for example, sodium nitrite or potassium nitrite, or both. The drilling fluid may include $AlCl_3$ and nanosilica to retard attack of the filter cake by the HF. The acid-generating material may include ammonium fluoride ($NH_4F$) and an oxidizer to generate HF. The acid-generating material may include ammonium chloride ($NH_4Cl$) and an oxidizer to generate HCl. The acid-generating material may include ammonium hydrogen difluoride [$(NH_4)HF_2$] to generate HF from the HCl. The drilling fluid may include a chelating agent to attack the filter cake. In implementations, the ammonium-containing compound and the nitrite-containing compound are separately encapsulated, and wherein the drilling fluid includes acetic acid or citric acid, for both, encapsulated with the ammonium-containing compound or the nitrite-containing compound to lower pH in the wellbore.

Example

The Example is given only as an example and not intended to limit the present techniques. Table 1 gives the composition of the drilling fluid used to form the filter cake in the Example. The amounts of the components in the drilling fluid are given as mass in grams (g), except that the amount of water in the drilling fluid is given as volume in cubic centimeters ($cm^3$). Sand is included in the drilling fluid because analysis of the actual drilling-fluid filter cake collected from a gas well showed that the sand content in the filter cake during drilling a horizontal well in a sandstone reservoir (formation) was 20 wt % of the solid content in the filter cake due to the contamination of drilled sand particles with the drilling fluid.

TABLE 1

Drilling Fluid Formulation (Composition)

| Additives | Chemical Formula | Amount | Units |
|---|---|---|---|
| Distilled Water | $H_2O$ | 241.5 | $cm^3$ |
| Xanthomonas Campestris (XC) Polymer (xanthan gum) | | 1 | g |
| Caustic Soda (sodium hydroxide) | NaOH | 0.25 | g |
| Sodium Chloride | NaCl | 22 | g |
| Starch (hydroxypropyl) | $C_6H_5O_{10}$ | 4 | g |
| Calcium Carbonate $CaCO_3$ (25 micron) | $CaCO_3$ | 3 | g |
| Calcium Carbonate $CaCO_3$ (38 micron) | $CaCO_3$ | 3 | g |
| Barite (60 micron) | $BaSO_4$ | 278 | g |
| Sand (60 micron) | $SiO_2$ | 60 | g |
| Encapsulated Thermochemicals (25 to 50 micron) | $NH_4Cl$ + $NaNO_2$ | 5.5 | g |
| Encapsulated Chelating Agent (25 to 50 micron) | DTPA | 8.5 | g |
| Encapsulated Acid-Generating Material (25 to 50 micron) | $NH_4F$ + Oxidizer $NaBrO_3$ | 10 | g |

During drilling sandstone formations, the drilled sand particles may contaminate the drilling fluid and thus the formed filter cake may include sand. The collected field samples from a drilled gas horizontal well in a sandstone formation showed that the sand content in the filter cake may reach as much as 30 wt % of the solid content of the filter cake. This high sand content in the filter cake may degrade the filter-cake removal efficiency in conventional acid treatments. Conventional design of filter cake removal for filter cake formed from calcite-based drilling fluids in drilling sandstone formations typically considers only primarily calcite (and not any sand) as 100% solid content of the filter cake. This is why in conventional implementations, the efficiency of the well cleanup operation can be significantly different between conventional laboratory results (considers calcite but not sand in the filter cake) versus field results (the filter cake has both sand and calcite). While the Example expressly mentions barite-based drilling fluid and barite-based filter cake, calcite-based filter cake is also applicable. Embodiments are applicable for barite and calcite.

Beneficially, in present embodiments, the generated HF may react with the sand particles, and the generated HCl may react with calcite. This may enhance the filter-cake removal efficiency compared to the conventional design. Again, the heat generated by the thermochemical reaction (e.g., equation (1)) may initiate the acid-generating reactions to form the HF and HCl in-situ. In addition, the heat and pressure generated from the thermochemical reaction may break the filter cake and thus facilitate further decomposition the polymer in the filter cake.

Figure 8:
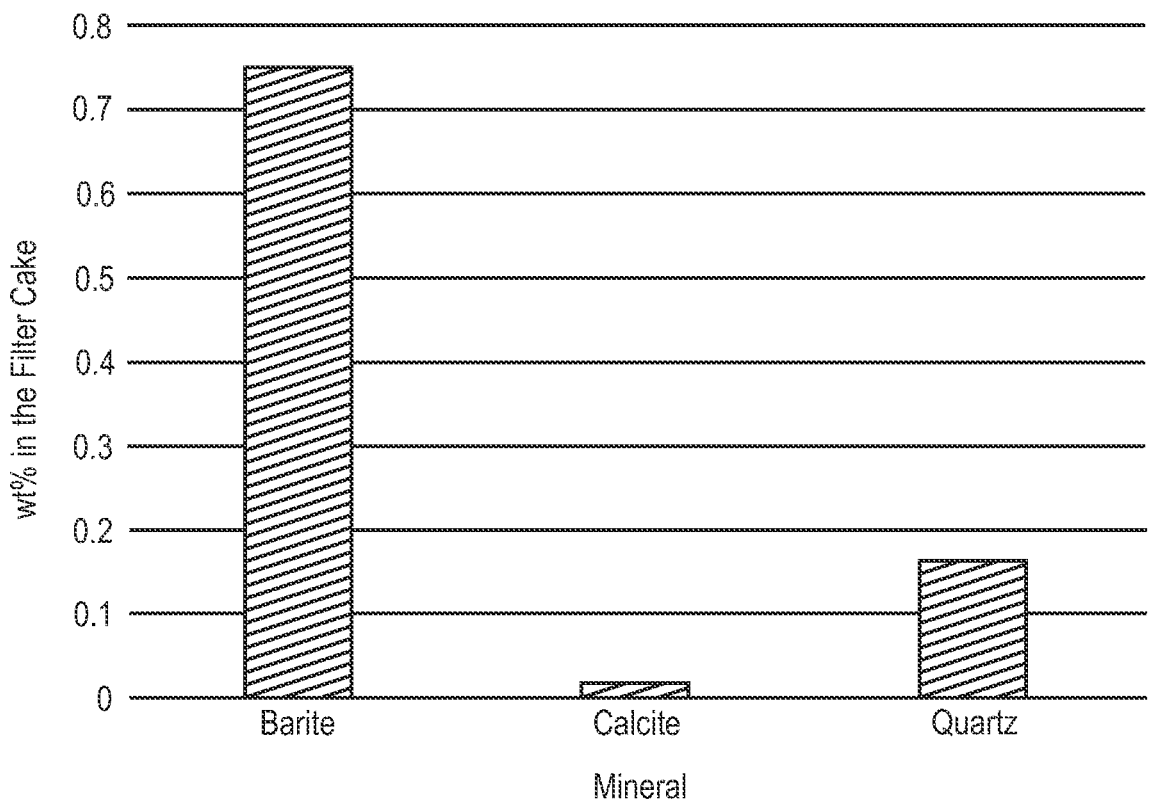
FIG. 8 is a plot of the amount of three minerals in the filter cake in the Example.

FIG. 8 is a plot of the amount (wt %) the three minerals (barite, calcite, and quartz) in the filter cake (after drying the filter cake) in the Example. Again, the filter cake was formed from solids in the drilling fluid having the composition given in Table 1.

Figure 9:
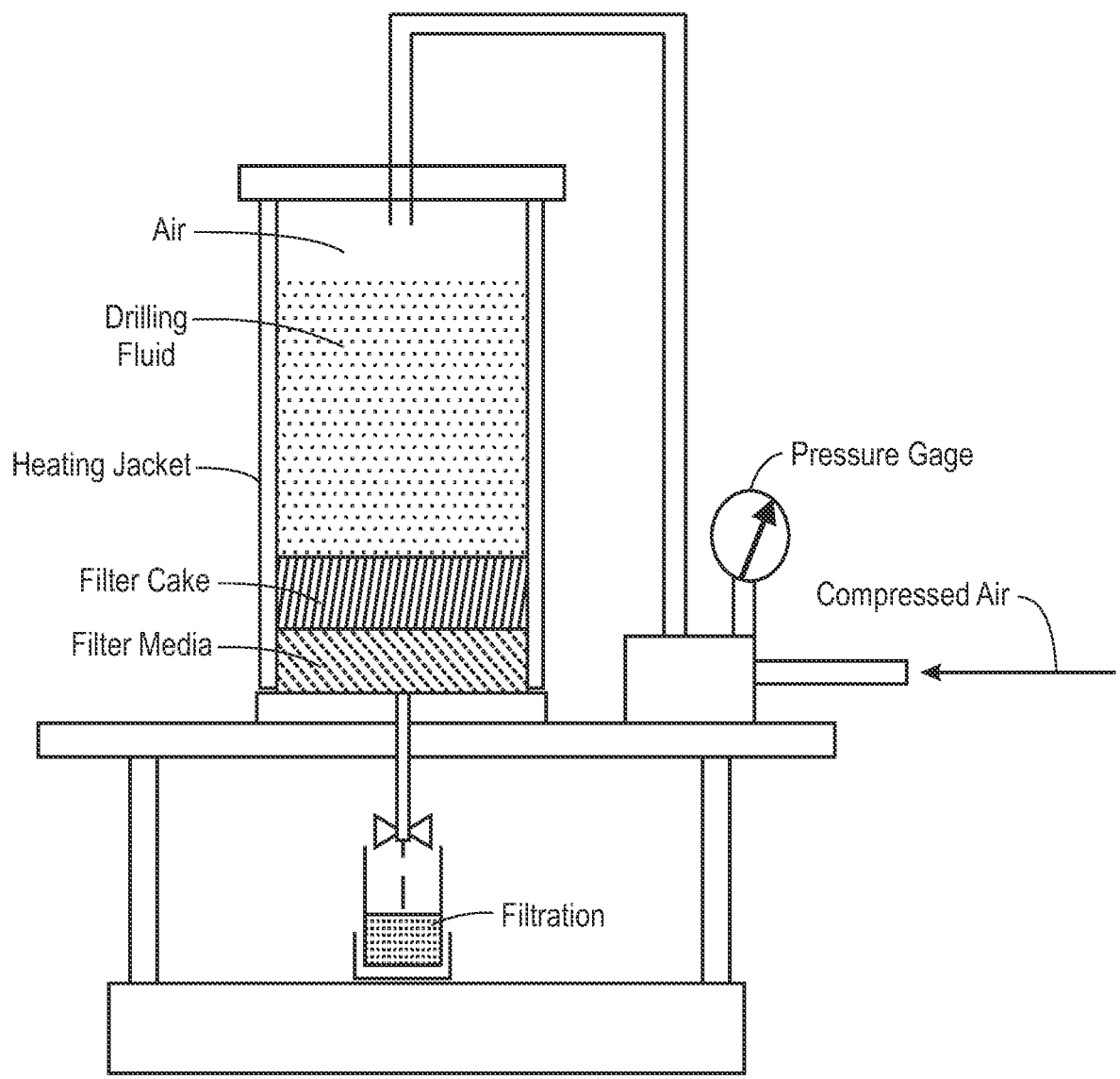
FIGS. 9-10 are diagrams of the laboratory apparatus utilized in the Example
Figure 10:
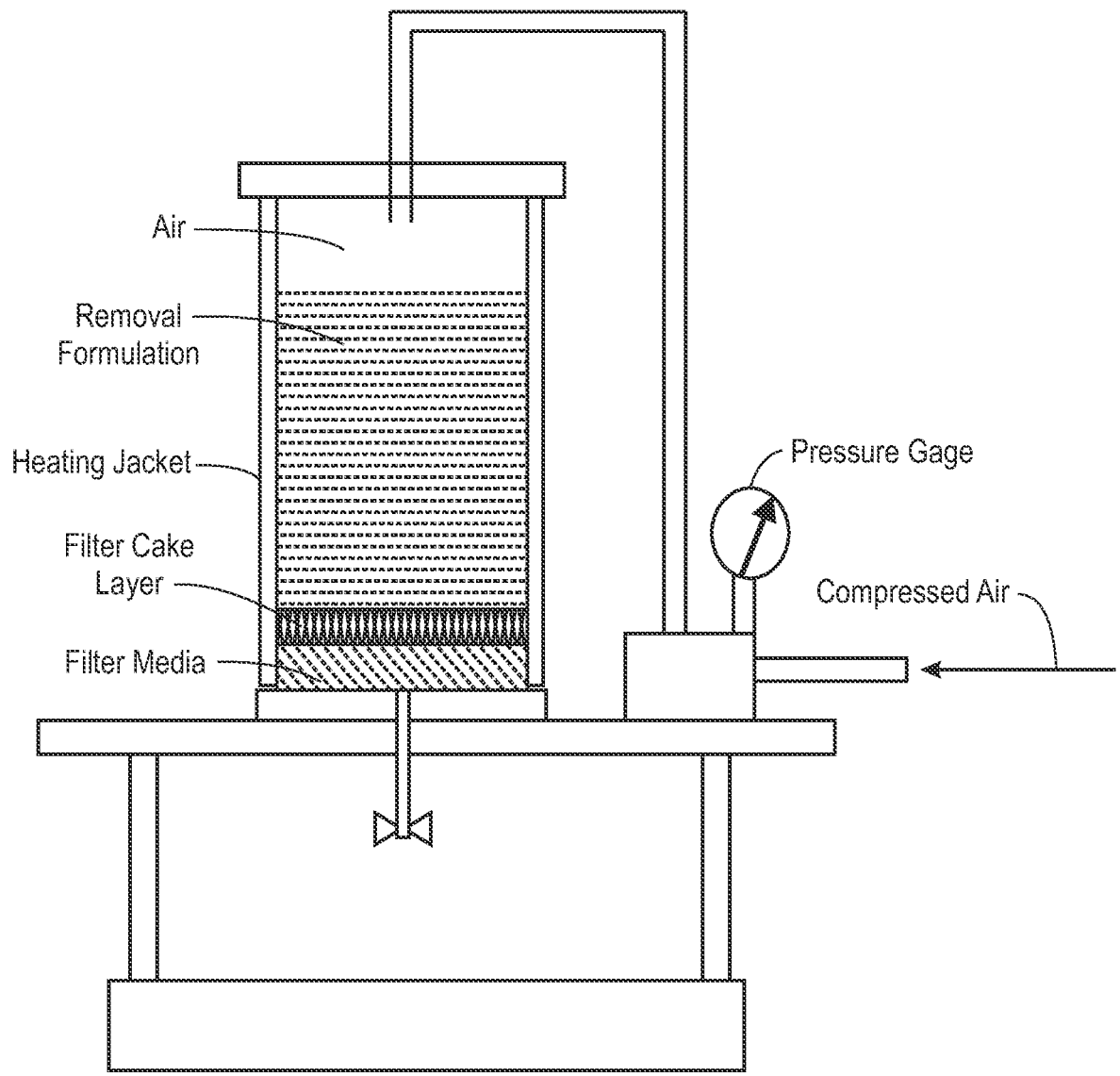

FIGS. 9-10 depict the laboratory apparatus (experimental set-up) utilized to form the filter cake (barite filter cake) in the Example and to remove (attack, degrade) the filter cake in the Example. The heating jacket is an electrical heater.

FIG. 9 is the apparatus set up to form the filter cake (as a disk) with the drilling fluid having the composition in Table 1. Therefore, the solids and the encapsulated materials (listed in last three rows) of Table 1 were incorporated into the filter cake. The filter cake was formed over 2 days. At the conclusion of the 2 days of forming the filter cake, the filter cake (disk) was weighed.

Then, the removal started, with the configuration depicted in FIG. 10. The removal lasted 3 days, as discussed below. Thus, a total of 5 days for the Example include 2 days to form (FIG. 9) the filter cake and 3 days to remove (FIG. 10) filter cake.

FIG. 10 is the apparatus set up to remove the filter cake with the drilling fluid having the composition in Table 1. The removal formulation was the drilling fluid having the composition in Table 1. Thus, the removal formulation was the same as the formulation used to form the filter cake. In the laboratory apparatus (FIG. 10), after the aforementioned 2 days to form the filter cake (FIG. 9), the removal formulation was heated for three hours up to 90° C. to start the removal. The encapsulation of the encapsulated materials decomposed. The filter cake removal occurred after the decomposition of the encapsulation (capsules) of the encapsulated materials (last three rows) given in Table 1. The thermochemicals, acid-generating material, and chelating agent contributed to the removal of the filter cake. The capsules decomposed and released the thermochemicals, acid-generating materials, and chelating agent, which resulted in the removal of the filter cake. The weight removal efficiency reached 90% after 3 days of removal. The 90 wt % removal was determined by weighing the filter cake before and after the treatment. As mentioned, the filter cake disk was weighed at the conclusion of the initial 2 days of forming the filter cake to give the before treatment weight. The filter cake disk at the conclusion of 5 days (conclusion of 3 days of treatment) to give the after treatment weight. In conclusion, the result in the Example is that 90 wt % of the barite filter cake was removed with the barite filter cake subjected for 3 days to the removal formulation (drilling fluid having composition in Table 1) (initially heated for 3 hours). Another similar test gave a 95 wt % removal efficiency of the barite filter cake disk after 2 days of be subjected to removal formulation of drilling fluid with the additives.

In application, thermochemical additives may be incorporated in the filter cake formulation during drilling. The thermochemicals may be activated after drilling operation is complete, thereby generating heat and pressure to generate acid from acid-generating material and disintegrate filter cake. The results of example showed that this technique can removed filter cake after two or three days and with a removal efficiency of 90-95 wt % for the barite filter cake in water based drilling fluid.

A number of implementations have been described. Nevertheless, it will be understood that various modifications may be made without departing from the spirit and scope of the disclosure.

What is claimed is:

1. A method of treating a wellbore for filter cake removal, comprising:
providing a treatment fluid comprising
a first set of thermochemical reagents encapsulated in a first set of capsules,
a second set of thermochemical reagent encapsulated with a pH buffering acid in a second set of capsules,
an acid-generating material encapsulated in a third set of capsules, and
a retarding system comprising aluminum chloride (AlCl3), into a wellbore in a subterranean formation to attack filter cake in the wellbore, the filter cake comprising barite and quartz, or calcite and quartz; and
attacking the filter cake via the treatment fluid,
wherein the acid-generating material generates an in-situ generated acid in the wellbore to attack the filter cake, and
the retarding system retards a reaction of the in-situ generated acid with the quartz in the filter cake.

2. The method of claim 1, wherein the treatment fluid comprises an aqueous treatment fluid, wherein the in-situ generated acid comprises hydrofluoric acid (HF) wherein the retarding system further comprises nanosilica.

3. The method of claim 1, comprising drilling the wellbore with a drilling fluid comprising the treatment fluid, wherein the first and second sets of thermochemical reagents and the acid-generating material are deposited in the filter cake during the drilling.

4. The method of claim 1, comprising removing at least a portion of the filter cake from the wellbore by the attacking of the filter cake via the treatment fluid, wherein:
one of the first and second sets of thermochemical reagents comprises an ammonium-containing compound;
another of the first and second sets of thermochemical reagents comprises a nitrite-containing compound.

5. The method of claim 4, wherein the pH buffering acid comprises acetic acid, citric acid, or both, to lower pH in the wellbore.

6. The method of claim 1,
wherein the sets of capsules decompose in the wellbore, releasing the first and second sets of thermochemical reagents and the acid-generating material,
wherein the first and second sets of thermochemical reagents react in the wellbore, thereby generating heat that activates the acid-generating material to generate the in-situ generated acid, and
wherein the acid-generating material comprises ammonium fluoride (NH4F), an oxidizer, ammonium chloride (NH4Cl), or ammonium hydrogen difluoride [(NH4) HF2], or any combinations thereof.

7. The method of claim 1, wherein the thermochemical reagents are encapsulated in a polymer shell comprising poly(tert-butyl acrylate), poly(tert-butyl vinyl ether), poly(4-ethoxystyrene), poly(ethylene terephthalate), poly(2-hydroxypropyl methacrylate), polyvinylidene, poly(isopropyl methacrylate), poly(phenylene vinylene), poly(phenyl vinyl ketone), poly(vinyl pivalate), or poly(vinyl cyclohexanoate).

8. The method of claim 1, wherein the acid-generating material is encapsulated in a polymer shell comprising poly(tert-butyl acrylate), poly(tert-butyl vinyl ether), poly(4-ethoxystyrene), poly(ethylene terephthalate), poly(2-hydroxypropyl methacrylate), polyvinylidene, poly(isopropyl methacrylate), poly(phenylene vinylene), poly(phenyl vinyl ketone), poly(vinyl pivalate), or poly(vinyl cyclohexanoate).

9. A method of drilling a wellbore and treating filter cake, comprising:
drilling the wellbore in a subterranean formation with a drilling fluid resulting in
forming filter cake comprising barite and quartz along a wall of the wellbore from solids in the drilling fluid;
during or after drilling the wellbore, adding additives for treating the filter cake to the drilling fluid, wherein the additives comprise a first set of thermochemical reagents encapsulated in a first set of capsules, a second set of thermochemical reagents encapsulated with a pH buffering acid in a second set of capsules, an acid-generating material encapsulated in a third set of capsules, and a retarding system comprising aluminum chloride (AlCl3), resulting in
attacking the filter cake via the additives in the drilling fluid,
wherein the acid-generating material generates an in-situ generated acid in the wellbore to attack the filter cake, and
the retarding system retards a reaction of the in-situ generated acid with the quartz in the filter cake.

10. The method of claim 9, comprising generating hydrofluoric acid (HF) in the wellbore with the acid-generating material, wherein the retarding system further comprises nanosilica.

11. The method of claim 9, wherein the additives for treating the filter cake are added to the drilling fluid before completion of the drilling that forms the wellbore, and wherein the additives are deposited in the filter cake during the drilling.

12. The method of claim 9, wherein the additives for treating the filter cake are added to the drilling fluid after completion of the drilling that forms the wellbore, and wherein the drilling fluid having the additives is pumped into the wellbore to attack the filter cake.

13. The method of claim 9, wherein attacking the filter cake via the additives comprises attacking the filter cake with the acid generated by the acid-generating material, and wherein the in-situ generated acid comprises hydrofluoric acid (HF) or hydrochloric acid (HCl), or both.

14. The method of claim 9, wherein attacking the filter cake via the additives comprises decomposing the sets of capsules in the wellbore to release the first and second sets of thermochemical reagents and the acid-generating material,
wherein the first and second sets of thermochemical reagents react in the wellbore, thereby generating heat that activates the acid-generating material to generate the in-situ generated acid, and wherein one of the first and second sets of thermochemical reagents comprises an ammonium-containing compound and another of the first and second sets of thermochemical reagents comprises a nitrite-containing compound.

15. The method of claim 9, wherein the acid-generating material comprises ammonium fluoride (NH4F), an oxidizer, ammonium chloride (NH4Cl), or ammonium hydrogen difluoride [(NH4) HF2], or any combinations thereof.

16. The method of claim 9, wherein forming filter cake comprises forming the filter cake including the first and second sets of thermochemical reagents that are separately encapsulated and the acid-generating material as encapsulated.

* * * * *